United States Patent
Andre et al.

(10) Patent No.: US 6,607,625 B2
(45) Date of Patent: Aug. 19, 2003

(54) PROCESS FOR THE PRODUCTION OF AN ACOUSTIVELY RESISTIVE LAYER, RESISTIVE LAYER THUS OBTAINED, AND WALL USING SUCH LAYER

(75) Inventors: Robert Andre, La Croix-Falgarde (FR); Alain Porte, Colomiers (FR); Eric Rambaud, Les Sorinieres (FR)

(73) Assignee: EADS Airbus SA, Paris Cedex (FR)

( * ) Notice: Subject to any disclaimer, the term of this patent is extended or adjusted under 35 U.S.C. 154(b) by 0 days.

(21) Appl. No.: 09/745,724

(22) Filed: Dec. 26, 2000

(65) Prior Publication Data

US 2001/0005937 A1 Jul. 5, 2001

(30) Foreign Application Priority Data

Dec. 24, 1999 (FR) .............................................. 99 16449

(51) Int. Cl.$^7$ ................................................ B32B 31/00
(52) U.S. Cl. ................. 156/169; 156/308.2; 156/309.6; 181/284; 181/290; 181/291; 181/292; 181/294
(58) Field of Search ................................ 181/284, 290, 181/291, 292, 294; 156/308.2, 169, 309.6; 428/116

(56) References Cited

U.S. PATENT DOCUMENTS

| 4,671,841 | A | | 6/1987 | Stephens |
| 5,151,311 | A | | 9/1992 | Parente et al. |
| 5,315,820 | A | * | 5/1994 | Arnold ........................ 428/116 |

FOREIGN PATENT DOCUMENTS

| EP | 0 352 993 | | 1/1990 | |
| EP | 367135 A2 | * | 5/1990 | ............. B32B/3/12 |
| EP | 897174 A1 | * | 2/1999 | ......... G10K/11/162 |
| FR | 2 735 064 | | 12/1996 | |
| FR | 2 771 331 | | 5/1999 | |
| GB | 2 122 540 | | 1/1984 | |

* cited by examiner

Primary Examiner—Jeff H. Aftergut
(74) Attorney, Agent, or Firm—Young & Thompson

(57) ABSTRACT

A process for producing an acoustically resistive layer, particularly for the nacelles of aircraft jet engines. The process includes producing a structural component by using thermoplastic resins, this component having a given quantity of open surface relative to the acoustic waves to be treated. The structural component is connected to an acoustic metallic fabric having a mesh adapted to the open surface quantity of the structural component. Then, the thermoplastic resin is heated under pressure at high temperature.

20 Claims, 3 Drawing Sheets

PROCESS FOR THE PRODUCTION OF AN ACOUSTIVELY RESISTIVE LAYER, RESISTIVE LAYER THUS OBTAINED, AND WALL USING SUCH LAYER

BACKGROUND OF THE INVENTION

The present invention relates to a process for the production of a resistive layer for an acoustic wall, particularly for the production of nacelles of aircraft jet engines and more generally any conduit requiring soundproof walls.

The invention also covers the resistive layer obtained and an acoustically absorbing wall using this layer in combination with other layers.

There are known resistive layers that are more or less permeable to air which permit very significantly attenuating sound waves. These layers are combined with open work structures of the honeycomb type to constitute quarter wave resonators connected to a total reflector.

Resistive layers have the role of dissipating acoustic energy by transforming it into heat thanks to the viscous effects engendered during flow of the waves. They generally comprise at least one acoustically absorbent cloth and a reinforcing material.

Such layers as well as panels formed from these layers are disclosed in French patent application No. 2 767 411 in the name of the present applicant. In this application, it is provided to reinforce the mechanical resistance of a metallic cloth or sound deadening composite, by addition of a layer of structurally reinforcing material, connected to this resistive layer. In this application, reinforcing filaments are of adjustable open surface and secured to said cloth.

The acoustic cloth is essentially selected as a function of the high capacity to perform linear acoustic processing and to trap the acoustic waves in Helmholtz cells formed by the open work structure. This cloth is of a suitable mesh but its thickness is necessarily very low, of the order of 1 to 2 tens of a millimeter to give an order of size.

In the case of the choice of a metallic sound deadening cloth, there can be used a stainless grill of the type of those sold under the mark GANTOIS.

Such fabrics have the advantage of being available on the market and even with very low thicknesses as indicated, the mechanical resistance remains great relative to a fabric of synthetic material.

Thus, in the case of the nacelles of aircraft jet engines, the surface of the resistive layer is immediately in contact with solid particles such as grains of sand and small stones which give rise to erosion phenomena or else pieces of ice or possibly birds that are sucked in, which, at that speed, give rise to mechanical degradation.

The metallic fabric also has the advantage of conducting lightning well.

A first drawback remains its weight relative to synthetic materials, which also explains the very reduced thickness so as to limit excessive weight.

Another important drawback is the connection between this fabric and the reinforcing material, which is a perforated plate of light metal such as aluminum, a molded composite panel that is shaped or of filaments (which is to say strips of filaments, roving, braids or strands of filaments, according to the cross-section).

This connection is very important because in the case in which the fabric is disposed on the outside, on the side of the circulating air flow, it is necessary to avoid any delamination of the fabric relative to its support, particularly in the case of starting a mechanical rupture engendered accidentally or by a foreign body.

Thus, if delamination takes place, the pieces of fabric of greatest surface can tear off, which would be unacceptable.

Moreover, another problem is that of connecting the fabric to its support whilst maintaining the pores because any decrease in the quantity of holes (quantity of open surface) contributes to decreasing the sound deadening capacity of the resistive layer.

In the case in which the acoustic deadening cloth is interposed between the reinforcing layer and the honeycomb structure as provided in the specific arrangement according to the related patent application in the name of the same applicant, the connection problem is also very great. In this case, it is necessary that the connection between the open work honeycomb structure and the reinforcing layer takes place on opposite sides of the acoustic deadening fabric or even in part through the pores but always without closing these pores.

The techniques used in the prior art consist in resorting to thermosetting resins, but the control of this family of resins is difficult, and moreover, the connection gives lower resistance than the intrinsic resistance of the fabric itself, which it to say the filaments which comprise it, such that the bonding zone remains the weakest point of the resistive layer in its assembly.

SUMMARY OF THE INVENTION

The object of the present invention is to provide a process for the production of a resistive layer to produce a connection of its constituents, in different forms of arrangement, which is satisfactory by having capacities of solidity such that, mechanically for example, the resistance of the connection at the interface of the structural and acoustic components is greater than the intrinsic resistance of the acoustic deadening fabric, thereby forming a monolithic assembly.

The invention also covers the resistive layer obtained and walls provided with such a resistive layer.

To this end, the process of producing an acoustically resistive layer according to the present invention comprises the following steps:
  producing a structural component by using thermoplastic resins, this component having a given open surface quantity related to the acoustic waves to be treated,
  connecting a metallic acoustic cloth whose mesh is suitable for the open surface quantity of the structural component, and
  carrying out the polymerization of the thermoplastic resins under pressure and at high temperature.

The family of resins preferably used comprises:
  PEI: polyetherimides,
  PEEK: polyetheretherketones,
  PPS: polyphenelenesulfides,
  PA: polyamides, and
  PET: polyethyleneterephthalate According to embodiments, the resistive layer is obtained by shaping on a mold metallic acoustic fabric and by depositing or by winding filaments impregnated with thermoplastic resins forming the structural component on this fabric, or the other way around, and by the step of polymerization of the thermoplastic resins.

There can thus be produced the resistive layer by emplacement on a mold of a sheet of composite material comprising thermoplastic resins and added to this sheet metallic acoustic fabric, or the other way around, these steps being followed by polymerization of the thermoplastic resins.

There are utilized filaments of mineral and/or organic origin.

The invention covers the acoustically resistive layer obtained by the practice of these steps of the process, and the associated acoustically absorbing wall.

The process of production of a resistive layer will now be described in detail in the case of an assembly of practical embodiments, as well as the resistive layers obtained and the acoustically absorbent walls produced by using at least one such resistive layer.

BRIEF DESCRIPTION OF THE DRAWINGS

This description is given with respect to the accompanying drawings, which show.

DETAILED DESCRIPTION OF THE PREFERRED EMBODIMENT

Figure 1A:
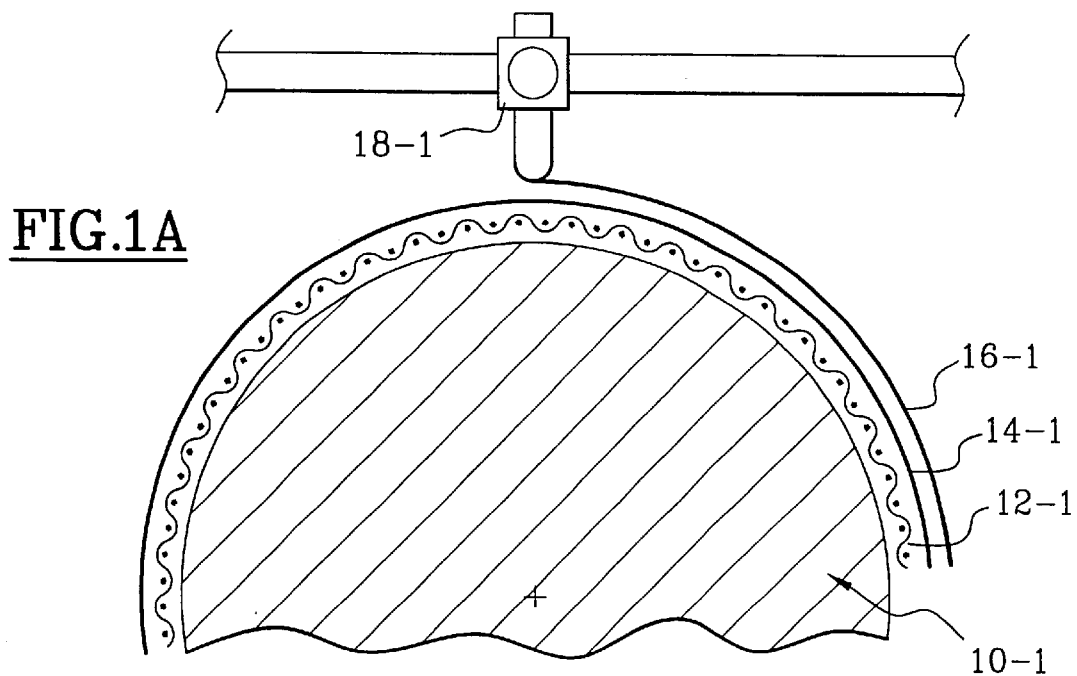
FIG. 1A, a view of an arrangement showing the practice of an embodiment of the process of production of a resistance layer according to the present invention, FIG. 1B, a cross-sectional view of the resistance layer obtained in FIG. 1A, FIG. 1C, a perspective view of this same resistive layer used in a single element in the production of an acoustically absorbent wall, FIG. 2A, a view of an arrangement showing the practice of a modification of the process of production of a resistive layer according to the present invention, FIG. 2B, a cross-sectional view of the modified resistive layer obtained in FIG. 2A, FIG. 2C, a perspective view of this same resistive layer used in the production of an acoustically absorbent wall, FIG. 3, a modified embodiment of an acoustically absorbent wall with a plate of composite material, the metallic fabric being on the aerodynamic surface side, and FIG. 4, a modified embodiment of an acoustically absorbent wall with a plate, the metallic cloth being disposed between the open work structure and the plate.
Figure 1B:
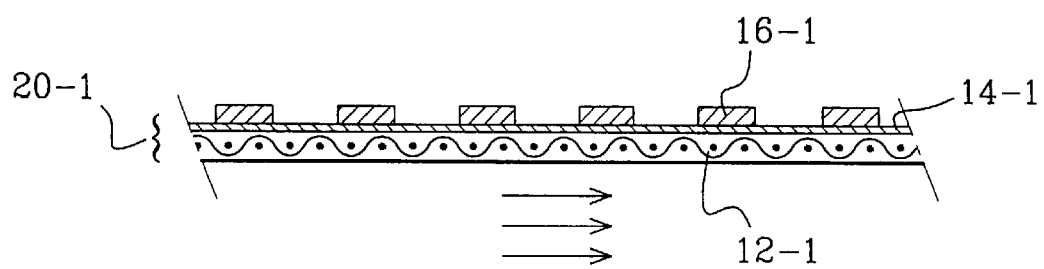

In the case of an embodiment of producing a resistive layer according to FIG. 1A, there is used a tool 10-1 called a mold, having the shape of the piece to be obtained, with the necessary dimensions to permit ultimate fine machining.

On the tool which forms the mold, there is deposited the metallic acoustic fabric 12-1 woven from filaments of stainless steel, for example the metallic fabric GANTOIS® in H5.30 whose thickness is of the order of 0.1 to 0.2 millimeter, with a geometric opening of 32 µm in one application, to the nacelles of aircraft jet engines.

On this fabric 12-1, there are deposited filaments impregnated with resin, for example carbon, glass or Kevlar® filaments. These filaments can be filaments properly so called, roving, braids or strands of filaments, whatever the cross-section. These filaments can also be constituted by several thousands of fibers according to the applications, 6,000, 12,000, 24,000.

These impregnated filaments are disposed in one or several layers and are oriented in different directions from one layer to the other. In the present example, there are provided two layers 14-1 and 16-1, crossing at 90°, which give an embodiment of a thickness of 0.6 to 2 millimeters, this by means of a suitable device 18.1.

The assembly is then brought under pressure to a high temperature with a suitable temperature increase curve profile which permits diffusion of the resin whilst adjusting the viscosity of the latter so as to avoid plugging the pores (by impregnation) whilst ensuring a good molding of the filaments of the stainless steel fabric.

It is as to this that the choice of resins is of interest, particularly those which are satisfactory.

Thus, the resin used is of the family of thermostable thermoplastics.

This family comprises preferably:

PEI: polyetherimicies,

PEEK: polyetheretherketones,

PPS: polyphenelenesulfides,

PA: polyamides, and

PET: polyethyleneterephthalates.

The resistive layer is thus made with carbon fibers interconnected by one of these resins or a mixture of them which ensures also the connection with the filaments of stainless steel of the fabric, no other adhesive being required. The mechanical resistance obtained is such that tests of traction result in a rupture of the filaments themselves, prior to separation of these same filaments from the resistive layer thus produced.

The quantity of open surface of the structural component of impregnated strands is obtained during laying down the filaments by respecting suitable spacing.

The quantity of open surface of the woven structure of stainless steel filaments must permit obtaining the required non-linear factor.

This assembly forms a resistive layer 20-1 of one monolithic piece which ensures the transfer of inertial aerodynamic forces as well as those which may be connected with the envisaged use. In the case of the nacelles of jet engines, it is necessary also to be able to receive and transmit forces connected to maintenance to the nacelle/motor structural connections.

FIG. 1A permits visualizing the superposition of the elements and the absence of an intermediate cement layer.

There can be produced an acoustically absorbing wall 22-1 from this resistive layer 20-1.

Figure 1C:
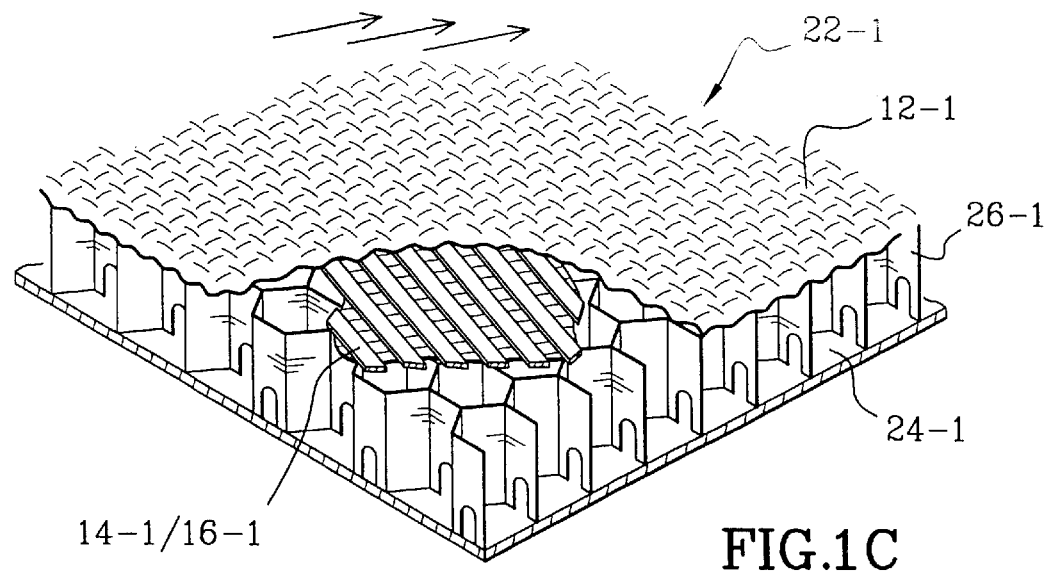

Thus, in FIG. 1C, there is produced an acoustic wall comprising a rear total reflector 24-1, connected in known manner to an open work structure 26-1, with characteristics which permit treating the frequencies characteristic of the noise to be attenuated.

On the other surface of the open work structure, there is connected the resistive layer.

In production, it is possible either to connect this resistive layer to the open work structure and to connect it by means of a particular cement interface, or to connect this resistive layer to the open work structure directly during production of the resistive layer.

Thus, the thermoplastic resins used can, with certain parameters suitable in practice, permit producing the connection of the impregnated filaments on sections of walls of the cells of the open work structure, generally of composite material.

There is thus obtained an acoustic wall with a resistive layer having good acoustic performance, particularly in terms of non-linearity and whose impedance does not depend on the Mach number of the passing flow.

The adhesion of the different interfaces is excellent between the acoustic component and the structural component and between the structural component and the open work structure.

The design and production of the structural composite are facilitated while obtaining first class and homogeneous mechanical characteristics.

The fact of using a monolithic assembly assimilable to a sheet at the level of the resistive layer, permits a very easy distribution, which is an advantage for maintenance by users.

Figure 2A:
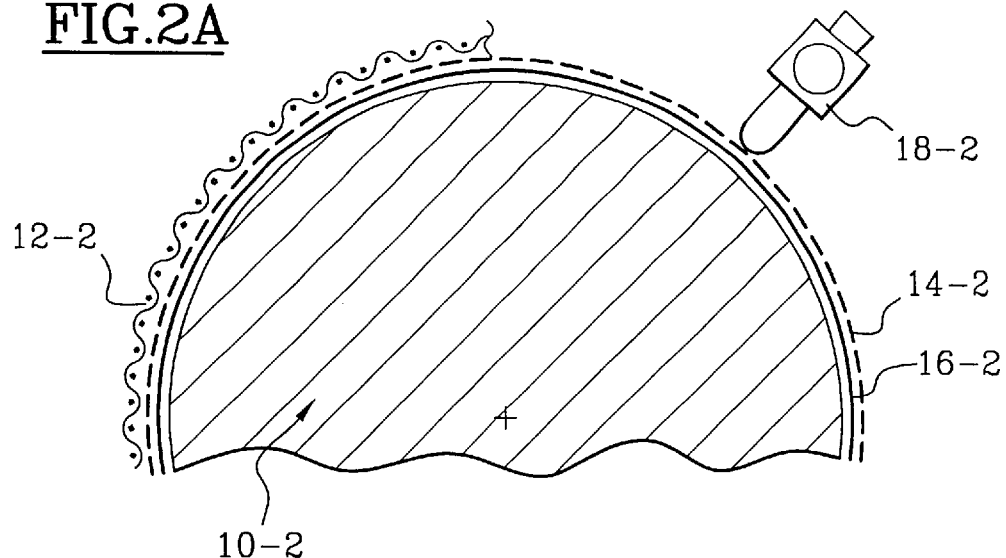

In the embodiment of FIG. 2A, there is provided a different arrangement of elements of the resistive layer, in reversed manner.

Thus, on the mold 10-2, whose surface corresponds to the flow side, there is made the structural component by depositing impregnated filaments in two or more phases with different orientations from one layer to the other, as before. In this case, two layers 14-2 and 16-2 are made. The precautions of known type are taken to avoid adhesion to the mold.

On this structural component, there is connected the acoustically resistive fabric, in this case the metallic sheet and in particular the sheet of stainless steel filaments.

The steps of polymerization are carried out, and there is obtained a resistive layer with a reversal of the arrangement of the layers relative to the preceding embodiment.

In this case, a supplemental advantage is that of ensuring the protection of the metallic fabric of very low thickness, by a thicker layer of composite material, less fragile to shock and foreign bodies.

Figure 2B:
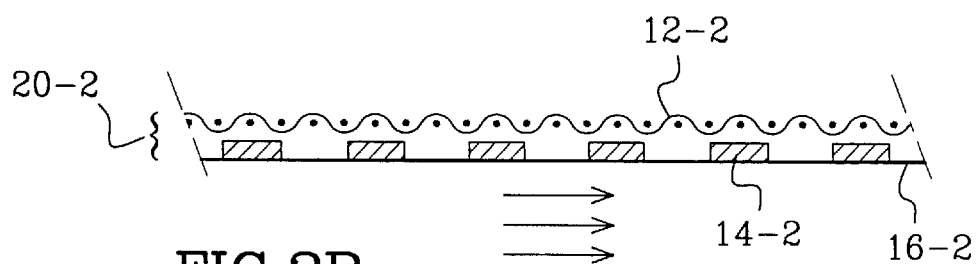
Figure 2C:
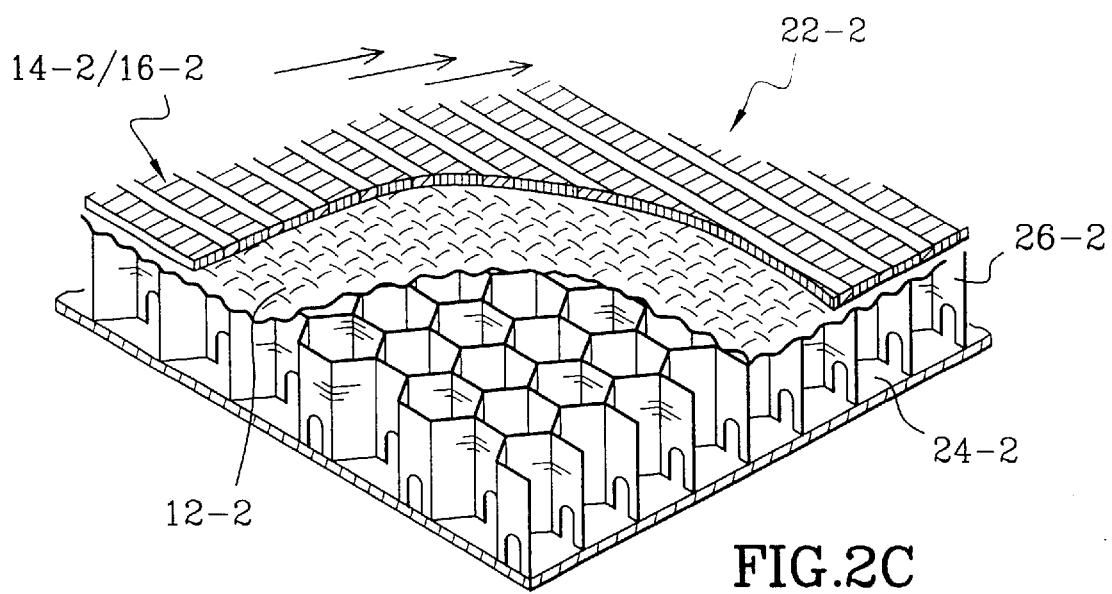

The cross-sectional view of FIG. 2B shows this arrangement.

The acoustic fabric can also be disposed between two layers of reinforcing material such as 14-2 and 16-2.

As to the production of an acoustical wall 22-2, there must be provided the connection of the acoustically resistive layer 20-2, to the other elements.

In this case, there can also be used the two embodiments of production.

In the first case, the resistive layer is produced independently and is connected to the sections of the cells of the open work structure 26-2. It thus is necessary to interpose a resin layer between the metallic cloth and said sections and to ensure its polymerization. This resin is preferably selected from the same family of thermoplastics cited above, comprising PEI, PEEK, PPS, PA and PET.

There is thus obtained the same result of very high adherence of the metallic fabric to the composite material in which is produced the open work structure.

The other solution is to connect the open work structure assembly 26-2 and the reflector 24-2 directly on the metallic fabric before polymerization, on the mold.

In this case, by dosing and suitable distribution of the resin and with a particular temperature profile and duration of polymerization, there is caused a connection between the metallic fabric and the open work structure, even also a direct connection between the filaments of the structural component and the sections of the walls of the cells, which leads to a wall having strong mechanical characteristics.

What was indicated in the case of deposition of impregnated filaments can also be carried out by winding filaments, which is to say by deposition under tension.

Figure 3:
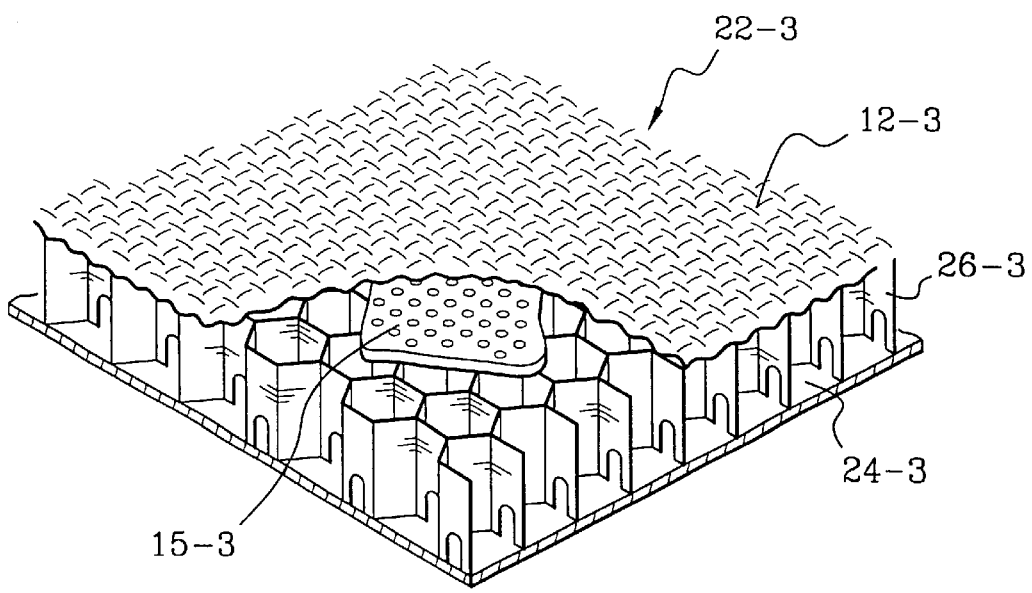
Figure 4:
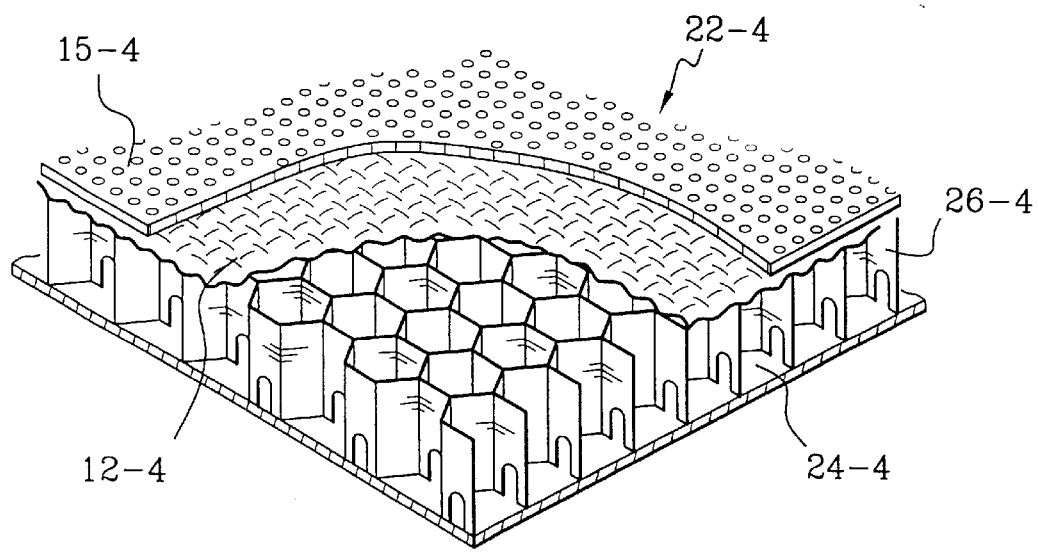

In the case of FIGS. 3 and 4, there are provided modified arrangements which have the characteristics of the preceding assembly but which use a different structural component for the resistive layer.

Thus, this structural component can be obtained from a sheet 15-3 of composite material pre-formed and perforated with micro-perforations, moreover already produced. This sheet comprises thermoplastic resins and the process remains the same.

In the case of the option of having the woven fabric 12-3 on the air side, there is used fabric on a mold, and the sheet 15-3 is deposited on this fabric and the thermoplastic resins which provide the mechanical connection are polymerized under pressure at high temperature. These thermoplastic resins are selected preferably from those of the family of PEI, PEEK, PPS, PA and PET.

In the case of the structural component option on the air side, the sheet 15-4 is deposited on the mold, the metallic fabric of stainless steel filaments 12-4 is connected to this sheet, and polymerization of the thermoplastic resins takes place under pressure at high temperature, which ensures mechanical connection. These thermoplastic resins are preferably selected from those of the family of PEI, PEEK, PPS, PA and PET.

Acoustically absorbent walls could then be produced, using such a resistive layer in the same manner as before, by connecting it to a structure 26-3, 26-4 of open work, itself provided with a reflective bottom 24-3, 24-4. The result is shown in FIGS. 3 and 4.

The examples given comprise for simplicity the description of a reflective backing with a single open work structure and an acoustically resistive layer, but any combination which might use arrangements of several of these elements obtained by the process of the present invention forms an integral part thereof.

What is claimed is:

1. A process for the production of an acoustically resistive layer, comprising the steps of:

forming a structural component from a thermoplastic resin, said structural component having a first open surface quantity, connecting said structural component to an acoustic metallic fabric having a mesh of a second open surface quantity, pressing said structural component and said acoustic metallic fabric together at a temperature having a temperature increase curve profile to diffuse said thermoplastic resin onto said metallic fabric, and adjusting a viscosity of said thermoplastic resin during said pressing step to prevent the thermoplastic resin from plugging the mesh.

2. The process for the production of an acoustically resistive layer according to claim 1, wherein the thermoplastic resins are selected from the group consisting of:

PEI: polyetherimides,

PEEK: polyetheretherketones,

PPS: polyphenelenesulfides,

PA: polyamides, and

PET: polyethyleneterephthalates.

3. The process for the production of an acoustically resistive layer according to claim 2, wherein the structural component is a filament and further comprising the step of placing the acoustic metallic fabric on a mold to shape the acoustic metallic fabric, and wherein said connecting step comprises winding said filament onto said acoustic metallic fabric.

4. The process for the production of an acoustically resistive layer according to claim 2, wherein the structural component is a filament and further comprising the step of winding said filament onto a mold before said connecting step.

5. The process for the production of a resistive acoustic layer according to claim 2, wherein the structural component is a perforated sheet of composite material including thermoplastic resin and further comprising the step of placing said perforated sheet of composite material onto a mold before said connecting step.

6. The process for the production of an acoustically resistive layer according to claim 1, wherein the structural component is a filament and further comprising the step of placing the acoustic metallic fabric on a mold to shape the acoustic metallic fabric, and wherein said connecting step comprises winding said filament onto said acoustic metallic fabric.

7. The process for the production of an acoustically resistive layer according to claim 6, wherein the filament is at least one of mineral and organic origin.

8. The process for the production of a resistive acoustic layer according to claim 6, wherein the structural component is a perforated sheet of composite material including thermoplastic resin and further comprising the step of placing said acoustic metallic fabric on a mold and said connecting step comprises placing said perforated sheet of composite material on said acoustic metallic fabric.

9. The process for the production of an acoustically resistive layer according to claim 6, wherein the structural component is two filaments, and wherein said connecting step comprises winding said two filaments onto said acoustic metallic fabric in first and second directions transverse to each other so that said two filaments establish said first open surface quantity.

10. The process for the production of a resistive acoustic layer according to claim 1, wherein the structural component is a perforated sheet of composite material including thermoplastic resin and further comprising the step of placing said perforated sheet of composite material onto a mold before said connecting step.

11. The process for the production of a resistive acoustic layer according to claim 1, wherein the structural component is a perforated sheet of composite material including thermoplastic resin and further comprising the step of placing said acoustic metallic fabric on a mold and said connecting step comprises placing said perforated sheet of composite material on said acoustic metallic fabric.

12. The process for the production of an acoustically resistive layer according to claim 1, wherein the structural component is a filament and further comprising the step of winding said filament onto a mold before said connecting step.

13. A process for the production of an acoustically resistive layer, comprising the steps of:

impregnating a plurality of filaments with a thermoplastic resin;

laying said filaments spaced apart from each other to form a structural component having a first open surface quantity, connecting said structural component to an acoustic metallic fabric having a mesh of a second open surface quantity, pressing said structural component and said acoustic metallic fabric together at a temperature having a temperature increase curve profile to diffuse said thermoplastic resin onto said metallic fabric, and adjusting a viscosity of said thermoplastic resin during said pressing step to prevent the thermoplastic resin from plugging the mesh.

14. The process for the production of an acoustically resistive layer according to claim 13, wherein the thermoplastic resins are selected from the group consisting of:

PEI: polyetherimides,

PEEK: polyetheretherketones,

PPS: polyphenelenesulfides,

PA: polyamides, and

PET: polyethyleneterephthalates.

15. The process for the production of an acoustically resistive layer according to claim 13, further comprising the step of placing the acoustic metallic fabric on a mold to shape the acoustic metallic fabric, and wherein said laying and connecting steps comprises winding said plural filaments onto said acoustic metallic fabric.

16. The process for the production of an acoustically resistive layer according to claim 13, further comprising the step of winding said filaments onto a mold before said connecting step.

17. A process for the production of an acoustically resistive layer, comprising the steps of:

perforating a sheet of thermoplastic resin with microperforations having a first open surface quantity to form a structural component;

connecting said structural component to an acoustic metallic fabric having a mesh of a second open surface quantity, pressing said structural component and said acoustic metallic fabric together at a temperature having a temperature increase curve profile to diffuse said thermoplastic resin onto said metallic fabric, and adjusting a viscosity of said thermoplastic resin during said pressing step to prevent the thermoplastic resin from plugging the mesh.

18. The process for the production of an acoustically resistive layer according to claim 17, wherein the thermoplastic resins are selected from the group consisting of:

PEI: polyetherimides,

PEEK: polyetheretherketones,

PPS: polyphenelenesulfides,

PA: polyamides, and

PET: polyethyleneterephthalates.

19. The process for the production of a resistive acoustic layer according to claim 17, further comprising the step of placing said perforated sheet onto a mold before said connecting step.

20. The process for the production of a resistive acoustic layer according to claim 17, further comprising the step of placing said acoustic metallic fabric on a mold and said connecting step comprises placing said perforated sheet on said acoustic metallic fabric.

* * * * *